United States Patent
Cheng et al.

(10) Patent No.: US 6,886,852 B2
(45) Date of Patent: May 3, 2005

(54) FOLDABLE GOLF CART

(76) Inventors: Pao-Hsien Cheng, No. 139, Jen Yi 1st Street, Jen Te Hsiang, Tainan Hsien (TW); Ying-Hsiung Cheng, No. 139, Jen Yi 1st Street, Jen Te Hsiang, Tainan Hsien (TW); Michel Don Wade, 1408F Camivito Vistana, San Diego, CA (US) 92130

( * ) Notice: Subject to any disclaimer, the term of this patent is extended or adjusted under 35 U.S.C. 154(b) by 0 days.

(21) Appl. No.: 10/647,317

(22) Filed: Aug. 26, 2003

(65) Prior Publication Data

US 2005/0046130 A1 Mar. 3, 2005

(51) Int. Cl.⁷ .......................... B62B 1/00; B62D 61/06; F16B 7/10; F16C 11/00
(52) U.S. Cl. ................. 280/651; 280/655; 280/47.26; 280/646; 280/652; 280/654; 280/62; 280/DIG. 6; 403/83; 403/84; 403/101
(58) Field of Search ................. 280/651, 652, 280/654, 655, 47.26, 646, 47.27, DIG. 6, 62, 47.315, 645, 47.23; 403/83, 84, 92, 96, 101, 105

(56) References Cited

U.S. PATENT DOCUMENTS

| | | | | |
|---|---|---|---|---|
| 2,574,232 A | * | 11/1951 | Welsh | 280/42 |
| 5,028,061 A | * | 7/1991 | Hawkes | 280/47.4 |
| 5,765,857 A | * | 6/1998 | Hsiao | 280/646 |
| 6,152,465 A | * | 11/2000 | Shieh | 280/62 |
| 6,296,260 B1 | * | 10/2001 | Schiavone | 280/47.2 |
| 6,345,836 B1 | * | 2/2002 | Wu | 280/651 |
| 6,719,319 B2 | * | 4/2004 | Liao | 280/654 |

* cited by examiner

Primary Examiner—Christopher P. Ellis
Assistant Examiner—G B Klebe
(74) Attorney, Agent, or Firm—Rosenberg, Klein & Lee

(57) ABSTRACT

A foldable golf cart includes two main rods, and a handle connected to the main rods by means of a joining member, which includes left and right parts respectively coupled to the main rods, an intermediate part positioned between the left and the right parts and coupled to the handle, a knob arranged next to the right part, and a pivotal bolt inserted through the above parts and the knob; the left and the right parts have radial teeth opposing radial teeth of the intermediate part; the knob and the right part have protrusions, and slopes between the protrusions on opposing sides such that space can be provided between the parts, and the radial teeth disengage for allowing angular displacement of the left and the right parts relative to the intermediate part when the knob is turned such that the protrusions contact lower ends of the slopes of the right part.

2 Claims, 10 Drawing Sheets

FOLDABLE GOLF CART

BACKGROUND OF THE INVENTION

1. Field of the Invention

The present invention relates to a golf cart, more particularly one, which can be folded into a small size to occupy less space in packaging, storage, and transportation, and which is easy to fold.

2. Brief Description of the Prior Art

Referring to FIG. 12, a conventional golf cart includes a main support 10, a lower support base 11 connected to a lower end of the main support 10, two wheel supports 12 pivoted to the main support 10, a handle rod 16 connected to an upper end of the main support 10 at a lower end, an upper support 14 connected to an upper portion of the main support 10, a golf bag 15 supported in a position by the supports 10, 14 and the lower support base 11, and wheels 13 connected to lower ends of the wheel supports 12. Thus, one can pull the golf cart easily, holding a handle part of the handle rod 16.

However, the golf cart can't be folded into smaller size, and in turns, it will occupy much space, causing the cost of packaging, storage, and transportation to increase.

SUMMARY OF THE INVENTION

It is a main object of the present invention to provide a golf cart, which can be easily folded into smaller size.

The present golf cart includes two main rods, and a handle rod connected to the main rods by means of a joining member, which includes left and right parts respectively securely coupled to the main rods, an intermediate part arranged between the left and right parts and securely coupled to the handle rod, a knob arranged next to the right part, and a pivotal bolt inserted through the above parts and the knob. The left and the right parts have radial teeth opposing radial teeth of the intermediate part; the knob and the right part have protrusions, and slopes between the protrusions on opposing sides such that the knob can make the left and the right parts pressed against the intermediate part for the teeth to engage to block angular displacement of the left and the right parts relative to the intermediate part when the protrusions thereof contact upper ends of the slopes of the right part, and such that space can be provided between the parts for the teeth to disengage to allow angular displacement of the left and the right parts relative to the intermediate part when the knob is turned such that the protrusions thereof contact lower ends of the slopes of the right part.

BRIEF DESCRIPTION OF THE DRAWINGS

This invention will be better understood by referring to the accompanying drawings, wherein.

DETAILED DESCRIPTION OF THE PREFERRED EMBODIMENTS

Figure 1:
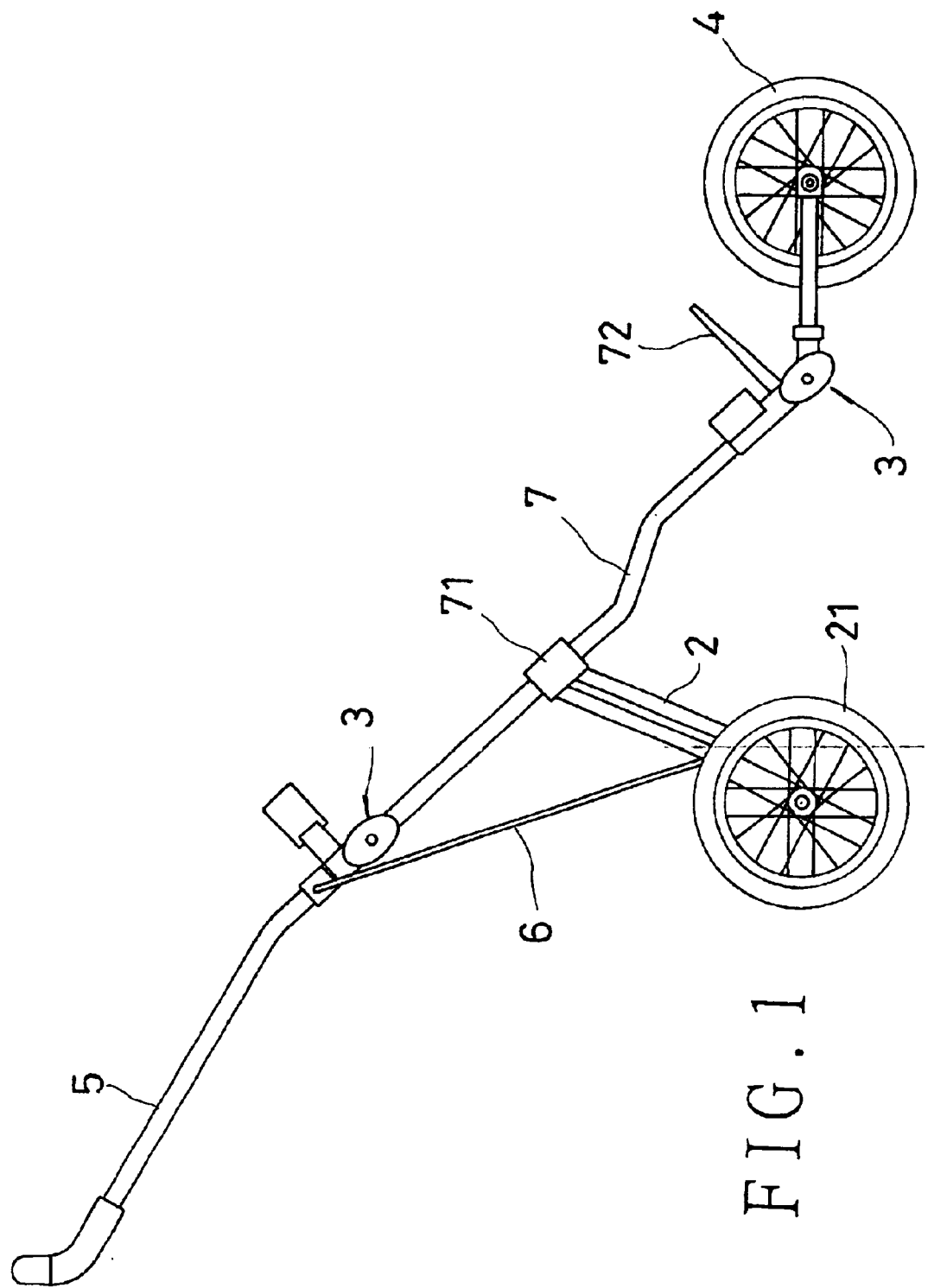
FIG. 1 is a side view of the golf cart of the present invention, in the stretched position.
Figure 2:
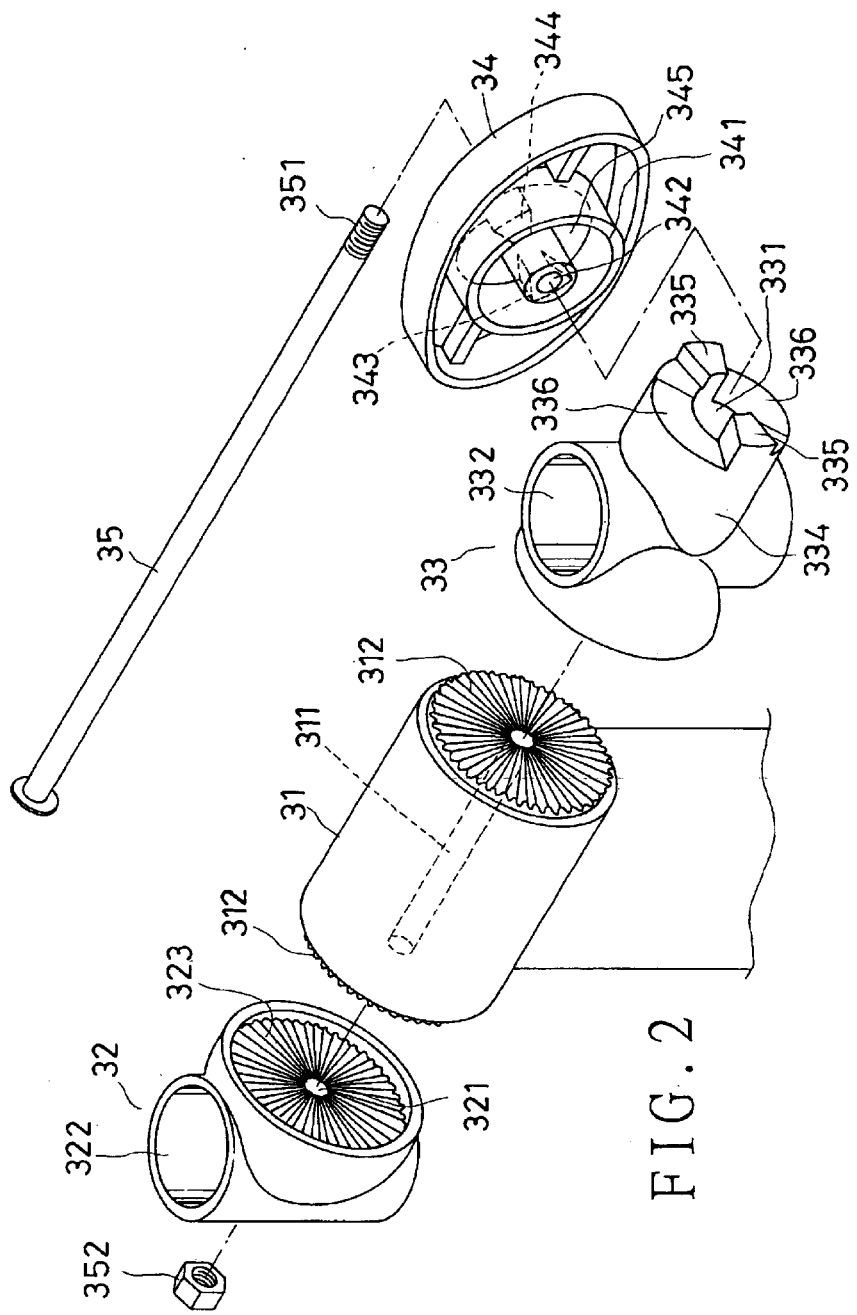
FIG. 2 is an exploded perspective view of a joining member of the golf cart according to the present invention.

Referring to FIGS. 1, and 2, a preferred embodiment of a foldable golf cart in the present invention includes two main support rods 7, a connecting element 71 secured to middle portions of the main support rods 7, two wheel supports 2 pivoted to the connecting element 71 at upper ends, rear wheels 21 connected to lower ends of the wheel supports 2, a lower base 72 secured to lower ends of the main support rods 7, a handle rod 5, two co-moving rods 6, a front wheel 4, and upper and lower joining members 3, 3.

The co-moving rods 6 are pivoted to the handle rod 5 at upper ends, and pivoted to respective ones of the wheel supports 2 at lower ends. The upper and the lower joining members 3, 3 are the same in structure. The handle rod 5 is connected to upper ends of the main support rods 7 by means of the upper joining member 3 while the a supporting element (not numbered) of the front wheel 4 is connected to lower ends of the main support rods 7 by means of the lower joining member 3.

Moreover, referring to FIG. 2, each of the joining members 3 has an intermediate connecting part 31, a left connecting part 32, a right connecting part 33, and a knob 34. Each of the intermediate connecting parts 31 has a main body, and a connecting portion (not numbered) projecting from the main body; the main body is formed with a central through hole 311 extending from a left end to a right end, and teeth 312 arranged in a radial manner on both the right and the left ends thereof. Each of the left connecting parts 32 has a through hole 321 extending from a left side to a right side thereof, a tube portion 322, and teeth 323 extending from an edge of the through hole 321 and arranged in a radial manner on the right side thereof. Each of the right connecting parts 33 has a first tube portion 332, and a second tube portion 334 projecting from a right side of the first tube portion 32, a through hole 331 extending from the left side to the right side thereof and along a central axis of the second tube portion 334, and teeth 333 extending from an edge of the through hole 331 and arranged in a radial manner on the left side thereof. Each of the second tube portions 334 is formed with two farthest-spaced opposing stopping protrusions 335 on the right end, and two slopes 336 between the stopping protrusions 335. Each of the knobs 34 has a holding tube 341, an insertion tube 343 received in, and coaxial wit the holding tube 341, a through hole 342 extending from a left side to a right side and along a central axis of the insertion tube 343, two farthest-spaced stopping protrusions 344 facing outwardly of the knob 34 between both the holding tube 341 and the insertion tube 343, and two slopes 345 facing outwardly of the knob 34 between the stopping protrusions 344.

Figure 3:
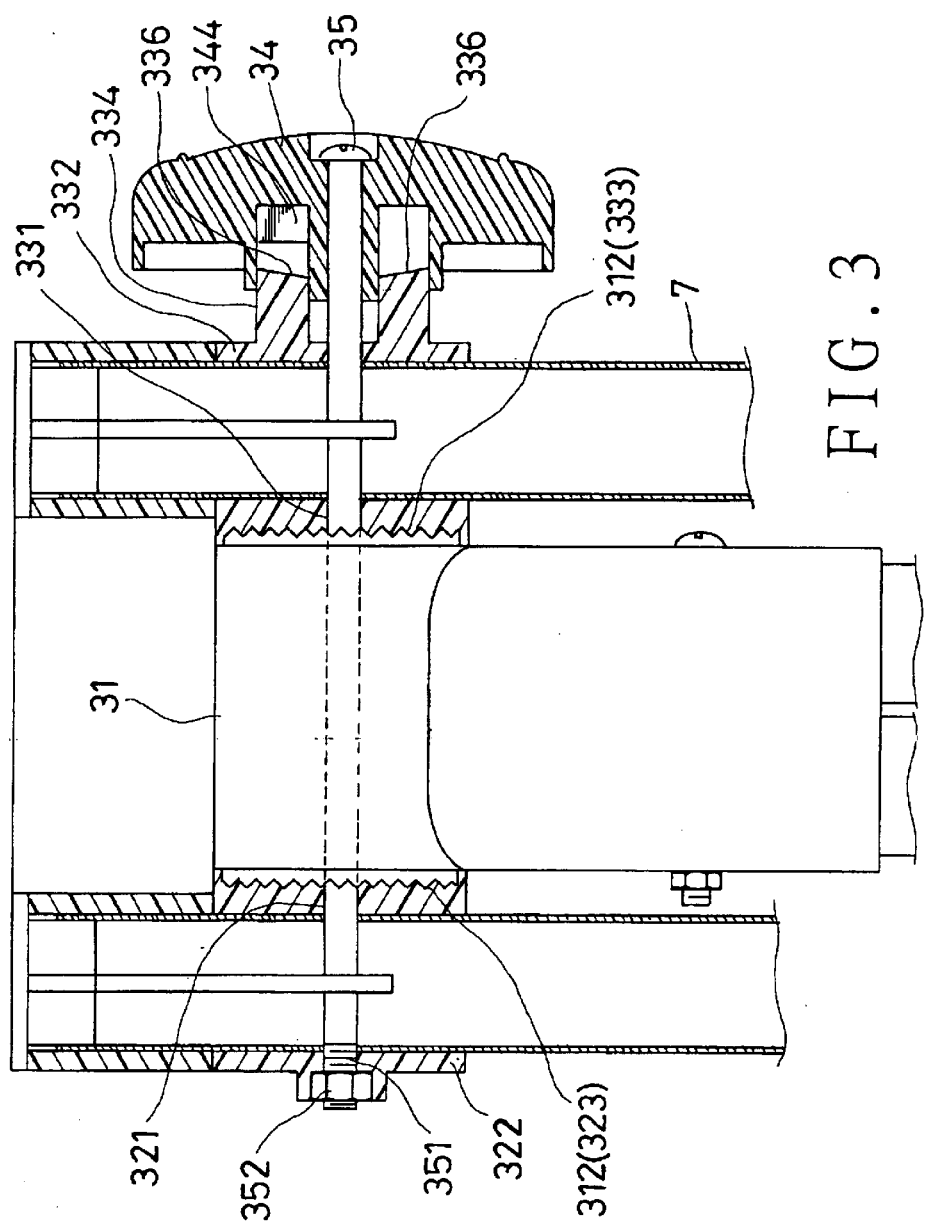
FIG. 3 is a partial front view of the golf cart of the present invention, with the upper joining member being in the locking position.

In combination, the left and the right connecting parts 32, 33 of the upper joining member 3 are respectively connected to the upper ends of the main support rods 7, 7 at the tube portions 322, 332 thereof while the left and the right connecting parts 32, 33 of the lower joining member 3 are respectively connected to the lower ends of the main support rods 7, 7 at the tube portions 322, 332 thereof. The connecting portion of the intermediate connecting part 31 of the upper joining member 3 is connected to the handle rod 5 while the connecting portion of the intermediate connecting part 31 of the lower joining member 3 is connected to the support of the front wheel 4. And, a pivotal bolt 35 is inserted through the knob 34, the right connecting part 33, the intermediate connecting part 31, and the left connecting part 32 of the upper joining member 3 in sequence, and then screwed into a nut 352 at a threaded portion 351 thereof such that the teeth 323, 333 of the left and the right connecting parts 32 and 33 respectively oppose the left and the right ends of the intermediate connecting part 31; when the knob 34 is turned to an upright position (FIGS. 4 and 5), the stopping protrusions 344 thereof will contact higher ends of the slopes 336 of the right connecting part 33, and at the same time the stopping protrusions 335 will contact higher ends of the slopes 345 of the knob 34 such that the teeth 323 and 333 will engage the teeth 312 of the intermediate connecting part 31 to prevent angular displacement of the left and the right parts 32 and 33 relative to the intermediate part 31, as shown in FIG. 3; when the knob 34 is turned to a laid down position (FIGS. 6 and 7), the stopping protrusions 344 thereof will contact lower ends of the slopes 336 of the right connecting part 33, and at the same time the stopping protrusions 335 will contact lower ends of the slopes 345 of the knob 34 such that the teeth 323 and 333 will disengage the teeth 312 of the intermediate part 31 to allow angular displacement of the left and the right parts 32 and 33 relative to the intermediate part 31, as shown in FIG. 8.

Figure 4:
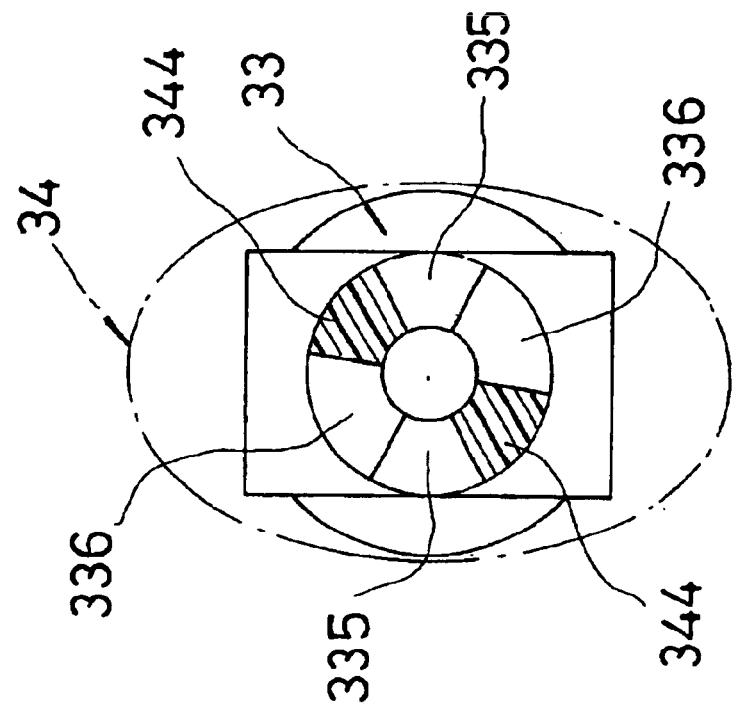
FIG. 4 is a side view of a joining member of the golf cart of the present invention, in the locking position.
Figure 6:
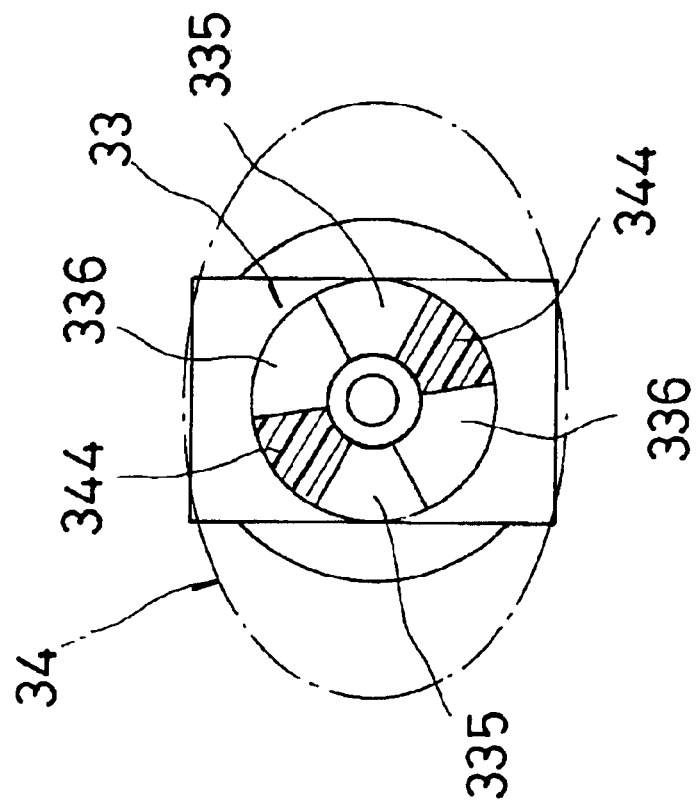
FIG. 6 is a side view of a joining member of the golf cart of the present invention, in the unlocking position.
Figure 5:
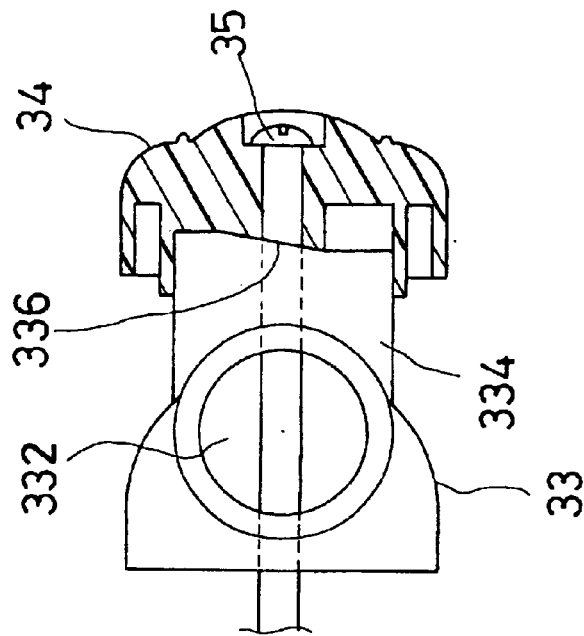
FIG. 5 is a vertical view of a joining member of the golf cart of the present invention, in the locking position.
Figure 7:
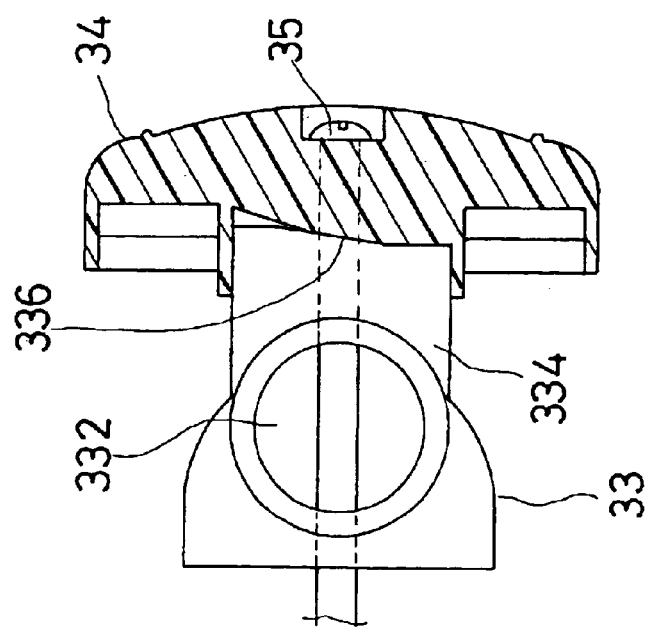
FIG. 7 is a vertical view of a joining member of the golf cart of the present invention, in the unlocking position.
Figure 8:
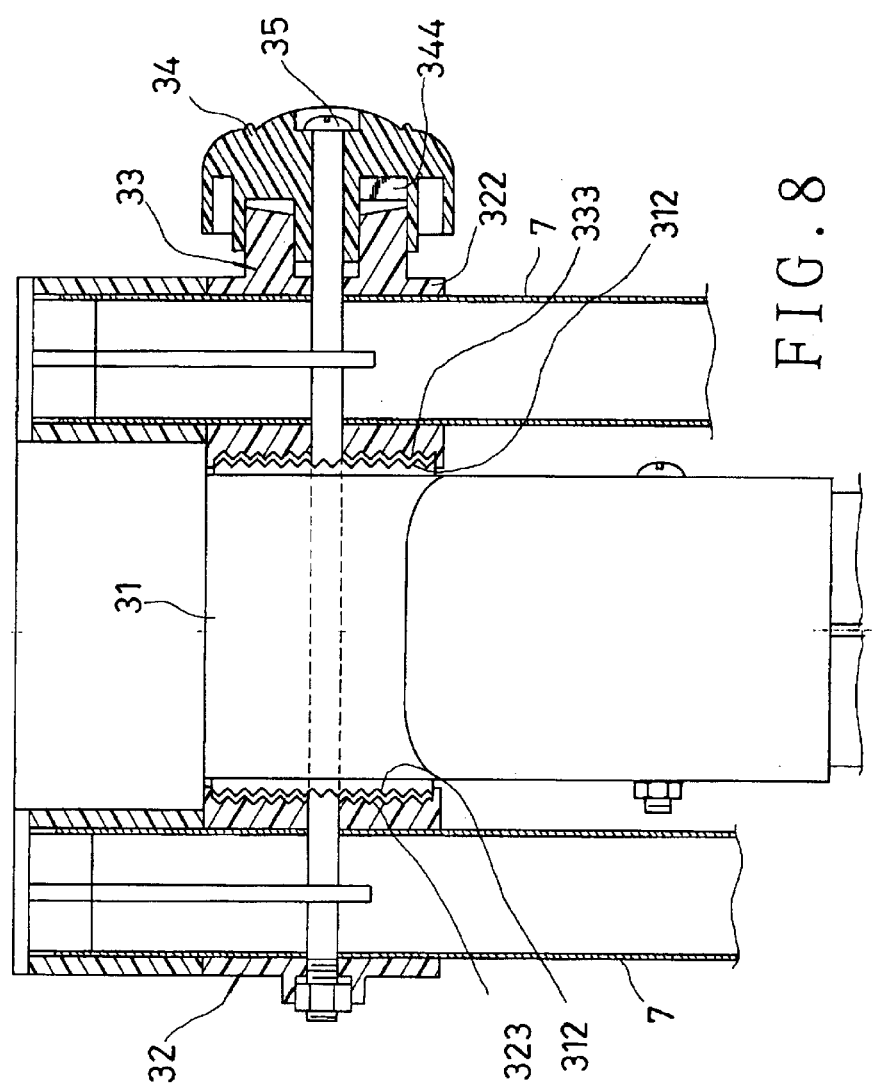
FIG. 8 is a partial front view of the golf cart of the present invention, with the upper joining member being in the unlocking position.
Figure 9:
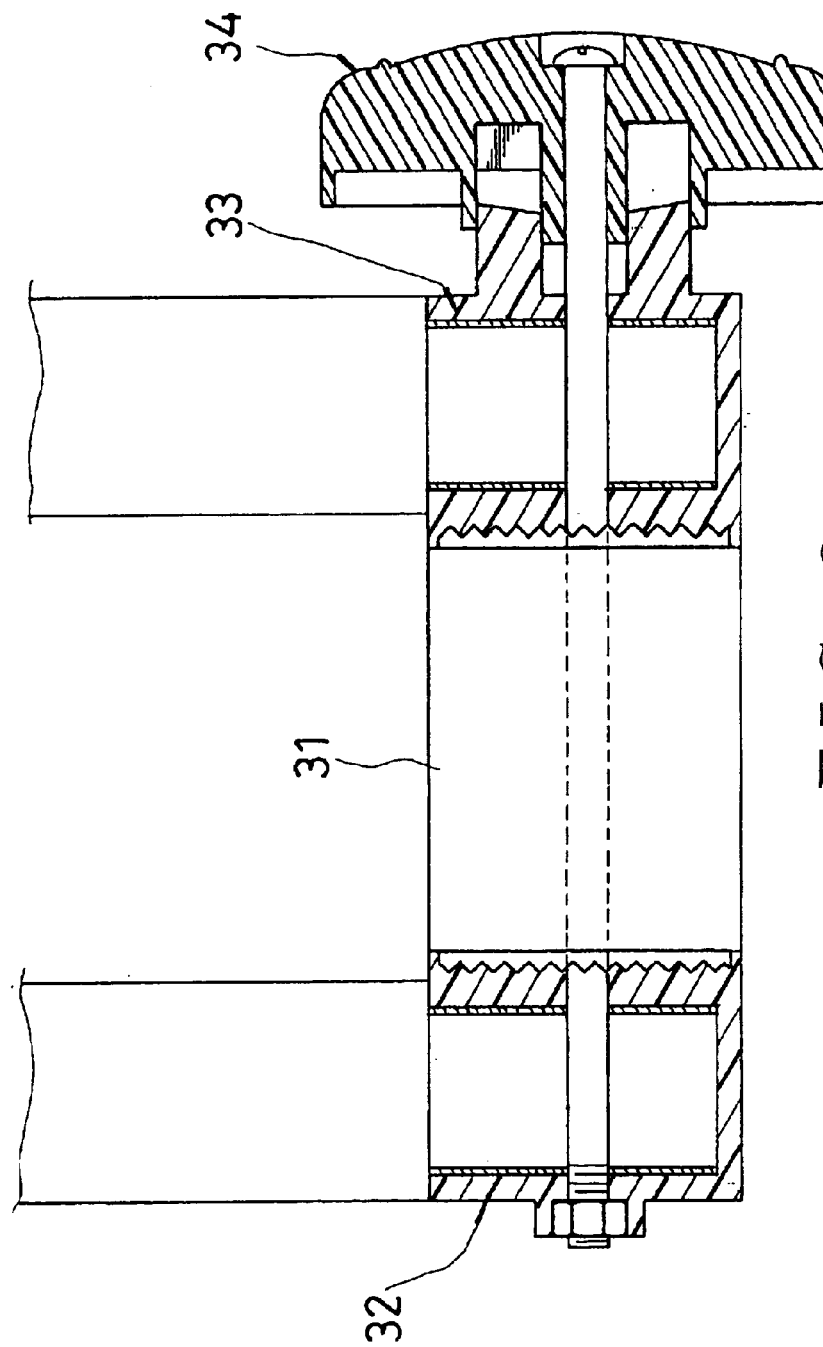
FIG. 9 is another partial front view of the golf cart of the present invention, with the lower joining member being in the locking position.
Figure 10:
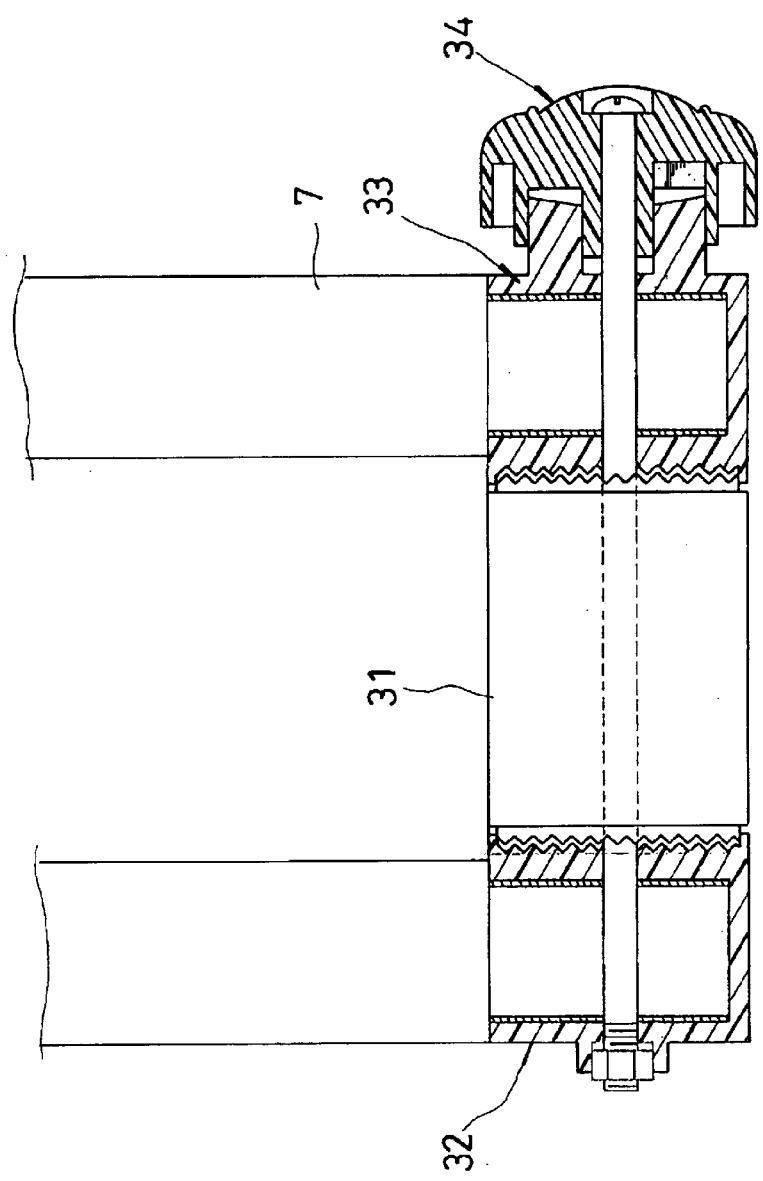
FIG. 10 is a partial front view of the golf cart of the present invention, with the lower joining member being in the unlocking position.

Similarly, another pivotal bolt 35 is inserted through the knob 34, the right connecting part 33, the intermediate connecting part 31, and the left connecting part 32 of the lower joining member 3 in sequence, and then screwed into another nut 352 at a threaded portions 351 thereof; thus, the lower joining member 3 can function in the same way as the upper one 3, capable of being made to lock (FIG. 9) by means of turning the knob 34 thereof to the upright position as shown in FIGS. 4 and 5, and unlock (FIG. 10) by means of turning the knob 34 to the laid down position as shown in FIGS. 6 and 7.

Figure 11:
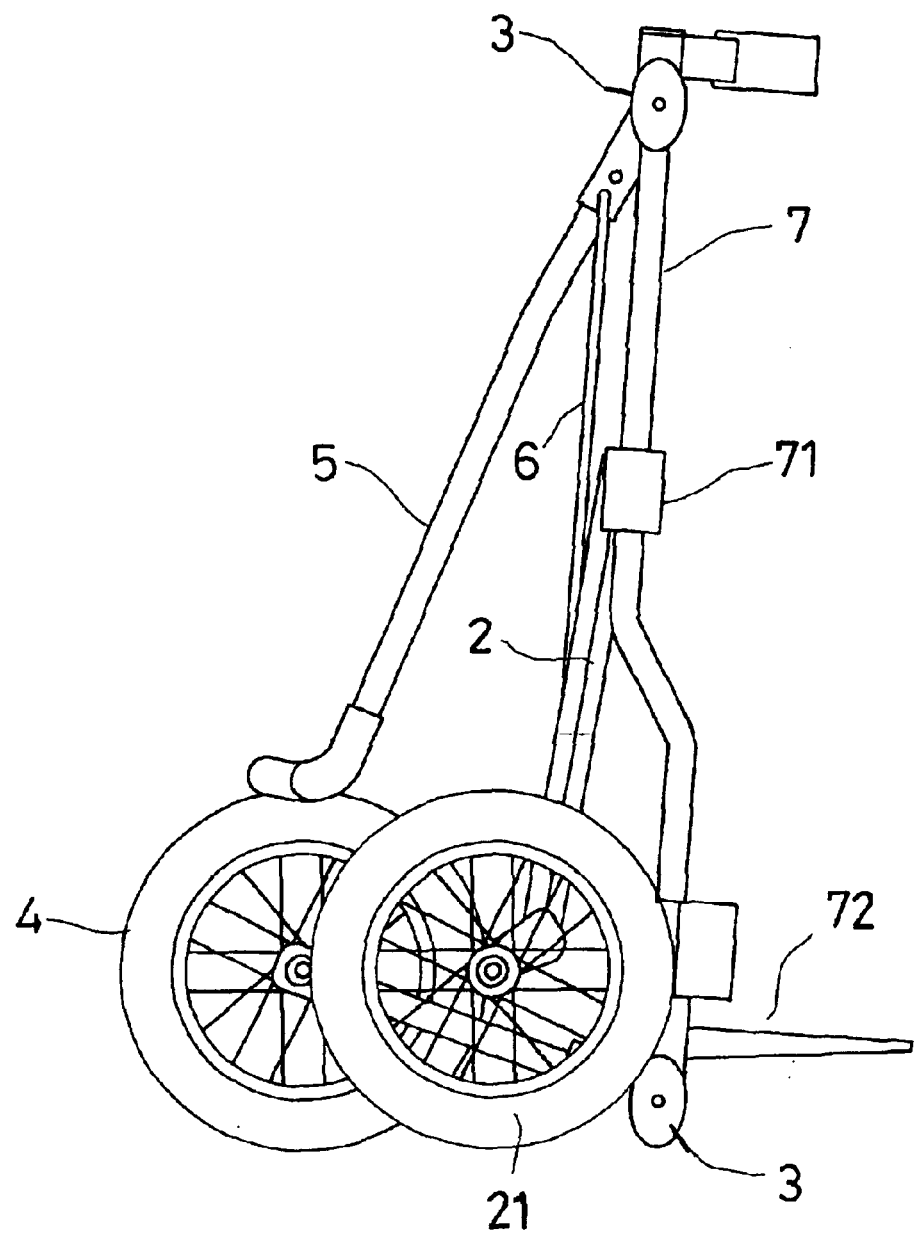
FIG. 11 is a side view of the golf cart of the present invention, in the folded position.
Figure 12:
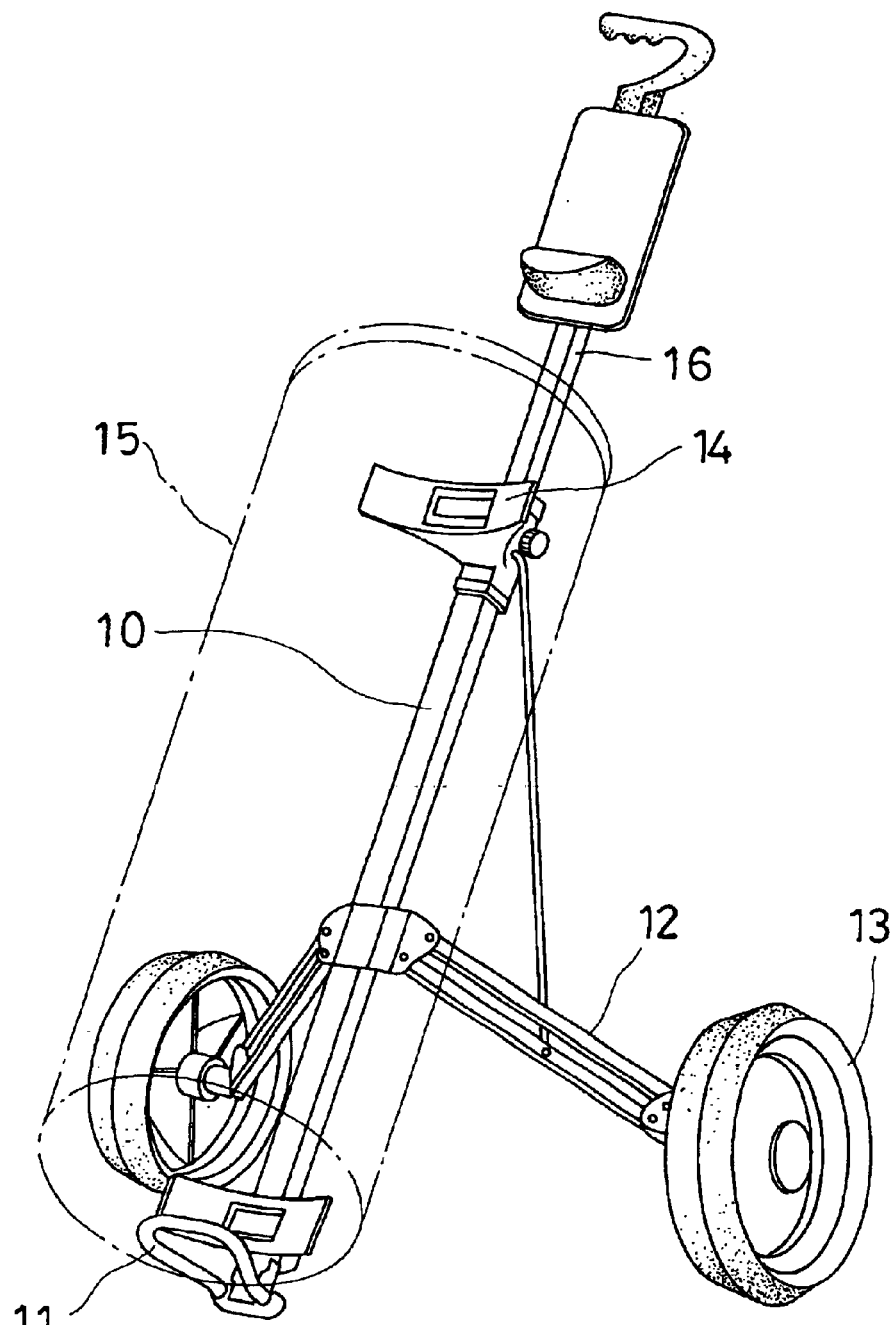
FIG. 12 is a perspective view of the conventional golf cart as described in the Background.

After the upper and the lower joining members 3, 3 are made to stay in the unlocking position, in which the teeth 323 and 33 disengage the teeth 312 of two ends of the intermediate connecting parts 31, the handle rod 5 and the front wheel support are pivoted on the intermediate connecting parts 31 to fold the golf cart into a smaller size, as shown in FIG. 11; the co-moving rods 6 will be pivoted close to the main support rods together with the handle rod 5 at the same time.

The knobs 34 are turned such as to make both of the joining members 3 lock again after the golf cart is folded such that the handle rod 5 and the support of the front wheel 4 can't move.

From the above description, it can be easily understood that the foldable golf cart of the present invention has advantages as followings:
1. Because of the joining members, the golf cart can be folded into a smaller size, and in turns, it will occupy less space, helping reduce the cost of packaging, storage, and transportation.
2. It is relatively easy to move the joining members 3 from the locking position to the unlocking position, and vice versa. Therefore, the golf cart is convenient to use.
3. The handle rod 5 and the front wheel support can be secured in position by means of the joining members 3 after they have been pivoted on the intermediate connecting parts 31 to fold the golf cart. Therefore, the golf cart is easy to package, store, and transport after it is folded.
4. Because the left and right connecting parts 32 are engaged with the intermediate connecting parts 31 by means of the teeth 323, 333, and 312 when the joining members 3 are made to lock, and because the teeth can engage each other effectively, it is not possible for the golf cart to fold after the joining members 3 have locked.

What is claimed is:
1. A foldable golf cart, comprising
an upper and a lower joining member, each joining member including:
  (a) an intermediate connecting part having teeth arranged in radial patterns on left and right ends thereof, the intermediate connecting part having a central through hole extending from the left end to the right end;
  (b) a left connecting part arranged next to the left end of the intermediate connecting part, the left connecting part having teeth arranged in radial patterns on a right side and opposing the teeth of the intermediate connecting part, the left connecting part having a through hole extending from the right side to a left side;
  (c) a right connecting part arranged next to the right end of the intermediate connecting part, the right connecting part having teeth arranged in radial patterns on a left side and opposing the teeth of the intermediate connecting part, the right connecting part having a horizontally extending right tube portion, the right connecting part having a through hole extending from a right end of the right tube portion to the left side, the right tube portion of the right connecting part having two spaced stopping protrusions projecting from the right end of the right tube portion, the right tube portion having two slopes between the stopping protrusions;
  (d) a knob having a holding tube, and an insertion tube received in and coaxial with the holding tube thereof, the knob being connected to the right connecting part in an angularly displaceable manner with the holding tube being positioned around the right tube portion of the right connecting part, and with the insertion tube being inserted in the through hole of the right connecting part, a pivotal bolt inserted through the insertion tube of the knob and the through holes of the right, the intermediate and the left connecting parts;
two main support rods respectively securely connected to the left and the right connecting parts of the upper joining member and respectively securely connected to the left and the right connecting parts of the lower joining member;
a connecting element secured to a middle portion of each of the main support rods;
two rear wheels, each of the rear wheels having a pair of supports pivoted to the connecting element at upper ends thereof;
a handle rod is securely connected to the intermediate connecting part of the upper joining member at a lower end;

two co-moving rods pivoted to the handle rod at upper ends of the co-moving rods, and respectively pivoted to the rear wheel supports at lower ends of the co-moving rods; and a front wheel securely connected to the intermediate connecting part of the lower joining member at a support thereof;

the knob having two spaced stopping protrusions between both the holding tube and the insertion tube thereof, the knob having two slopes between the stopping protrusions thereof;

the knob being connected to the right connecting part with the stopping protrusions thereof contacting respective ones of the slopes of the right connecting part, the knob being capable of making the left and the right connecting parts move close to the intermediate connecting part for the teeth of the left and right connecting parts to engage the teeth of the intermediate connecting part to block angular displacement of the left and the right connecting parts relative to the intermediate connecting part when the knob is turned to such a position in which the stopping protrusions thereof contact upper ends of the slopes of the right connecting part, and the stopping protrusions of the right connecting part contact upper ends of the slopes thereof, space being provided between the left and the right connecting parts and the intermediate connecting part for allowing angular displacement of the left and the right connecting parts relative to the intermediate connecting part by means of turning the knob to such a position in which the stopping protrusions of the knob contact lower ends of the slopes of the right connecting part, and the stopping protrusions of the right connecting part contact lower ends of the slopes of the knob.

2. The foldable golf cart as claimed in claim 1, wherein each of the pivotal bolts of the upper and the lower joining members has a threaded end portion projecting from the left connecting part and engaging a nut.

* * * * *